United States Patent
Wu et al.

(10) Patent No.: US 9,344,316 B2
(45) Date of Patent: *May 17, 2016

(54) ADAPTIVE TIME DIVERSITY AND SPATIAL DIVERSITY FOR OFDM

(71) Applicant: APPLE INC., Cupertino, CA (US)

(72) Inventors: Shiquan Wu, Cupertino, CA (US); Wen Tong, Cupertino, CA (US); Leo Strawczynski, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,481

(22) Filed: Sep. 10, 2014

(65) Prior Publication Data

US 2014/0376601 A1    Dec. 25, 2014

Related U.S. Application Data

(63) Continuation of application No. 13/678,702, filed on Nov. 16, 2012, now Pat. No. 8,837,272, which is a continuation of application No. 13/310,651, filed on Dec. 2, 2011, now Pat. No. 8,339,935, which is a continuation of application No. 12/806,481, filed on Aug. 13, 2010, now Pat. No. 8,077,599, which is a continuation of application No. 11/582,663, filed on Oct. 17, 2006, now Pat. No. 7,801,019, which is a continuation of application No. 11/315,056, filed on Dec. 22, 2005, now Pat. No. 7,336,601, which is a continuation of application No. 09/750,804, filed on Dec. 29, 2000, now Pat. No. 6,985,434.

(60) Provisional application No. 60/229,972, filed on Sep. 1, 2000.

(51) Int. Cl.
| | |
|---|---|
| *H04J 11/00* | (2006.01) |
| *H04L 27/26* | (2006.01) |
| *H04B 7/04* | (2006.01) |
| *H04B 7/06* | (2006.01) |
| *H04L 1/00* | (2006.01) |
| *H04L 1/06* | (2006.01) |

(52) U.S. Cl.
CPC .......... *H04L 27/2646* (2013.01); *H04B 7/0413* (2013.01); *H04B 7/0417* (2013.01); *H04B 7/063* (2013.01); *H04B 7/0697* (2013.01); *H04L 1/0001* (2013.01); *H04L 1/0625* (2013.01); *H04L 1/0631* (2013.01); *H04L 1/0675* (2013.01); *H04L 27/2626* (2013.01); *H04B 7/0669* (2013.01); *H04B 7/0689* (2013.01); *H04L 1/0003* (2013.01); *H04L 1/0009* (2013.01); *H04L 1/0026* (2013.01); *H04L 1/0662* (2013.01); *H04L 27/2628* (2013.01)

(58) Field of Classification Search
None
See application file for complete search history.

(56) References Cited

U.S. PATENT DOCUMENTS

| | | | | | |
|---|---|---|---|---|---|
| 5,982,327 | A | * | 11/1999 | Vook et al. | 342/380 |
| 6,128,276 | A | * | 10/2000 | Agee | 370/208 |

(Continued)

*Primary Examiner* — Bob Phunkulh
(74) *Attorney, Agent, or Firm* — Fay Kaplun & Marcin, LLP

(57) ABSTRACT

An adaptable orthogonal frequency-division multiplexing system (OFDM) that uses a multiple input multiple output (MIMO) to having OFDM signals transmitted either in accordance with time diversity to reducing signal fading or in accordance with spatial diversity to increase the data rate. Sub-carriers are classified for spatial diversity transmission or for time diversity transmission based on the result of a comparison between threshold values and at least one of three criteria. The criteria includes a calculation of a smallest eigen value of a frequency channel response matrix and a smallest element of a diagonal of the matrix and a ratio of the largest and smallest eigen values of the matrix.

18 Claims, 7 Drawing Sheets

(56) References Cited

U.S. PATENT DOCUMENTS

| | | | |
|---|---|---|---|
| 6,298,092 B1 * | 10/2001 | Heath et al. | 375/267 |
| 6,314,289 B1 * | 11/2001 | Eberlein et al. | 455/427 |
| 6,351,499 B1 * | 2/2002 | Paulraj et al. | 375/267 |
| 6,473,467 B1 * | 10/2002 | Wallace et al. | 375/267 |
| 6,542,556 B1 * | 4/2003 | Kuchi et al. | 375/299 |
| 6,560,209 B1 * | 5/2003 | Alamouti et al. | 370/330 |
| 6,587,526 B1 * | 7/2003 | Li et al. | 375/355 |
| 6,834,043 B1 * | 12/2004 | Vook et al. | 370/310 |
| 6,922,445 B1 * | 7/2005 | Sampath et al. | 375/267 |
| 6,952,454 B1 * | 10/2005 | Jalali et al. | 375/260 |
| 6,985,434 B2 * | 1/2006 | Wu et al. | 370/208 |
| 7,020,072 B1 * | 3/2006 | Li et al. | 370/208 |
| 7,916,806 B2 * | 3/2011 | Alamouti et al. | 375/299 |
| 2002/0154705 A1 * | 10/2002 | Walton et al. | 375/267 |

* cited by examiner

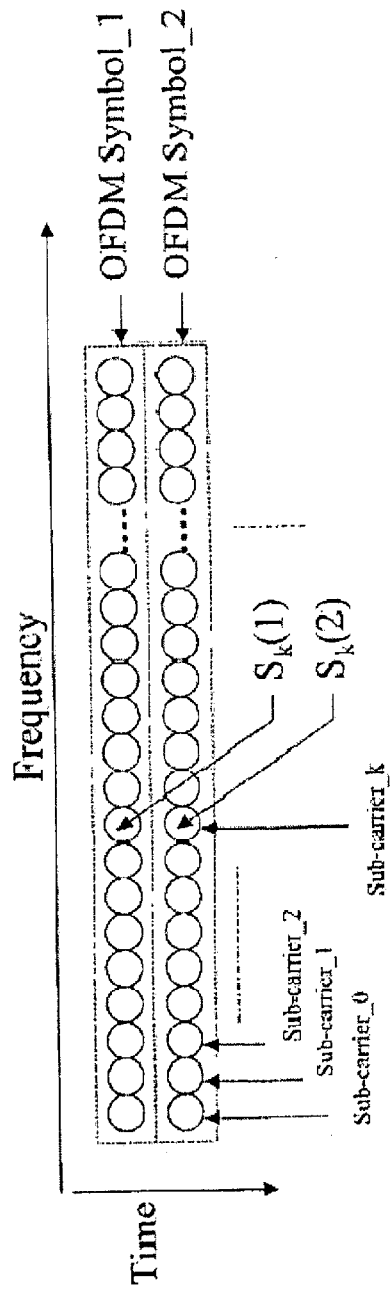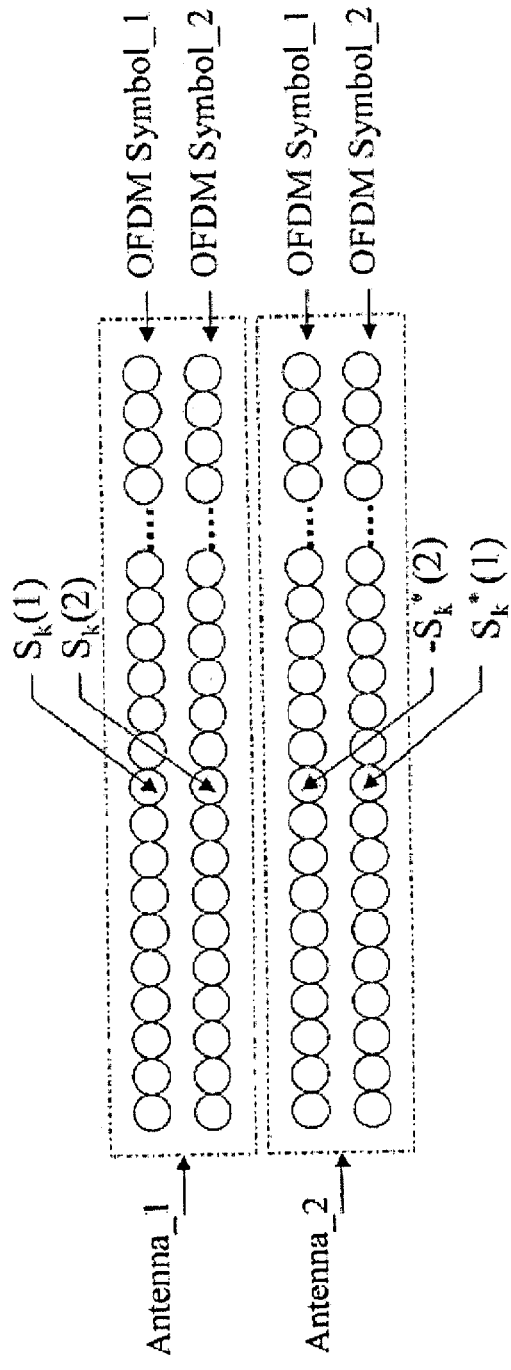
FIG. 2.
FIG. 3.

ADAPTIVE TIME DIVERSITY AND SPATIAL DIVERSITY FOR OFDM

CROSS-REFERENCE TO RELATED PATENT APPLICATIONS

This application is a continuation application of U.S. patent application Ser. No. 11/315,056, filed Dec. 22, 2005, which is a continuation application of U.S. patent application Ser. No. 09/750,804 to Shiquan Wu et al., filed Dec. 29, 2000, now U.S. Pat. No. 6,985,434, issued Jan. 10, 2006. U.S. patent application Ser. No. 09/750,804 claims priority to U.S. Provisional Patent Application No. 60/229,972, filed Sep. 1, 2000. The contents of the aforementioned applications are incorporated in their entirety herein by reference.

Reference is made to U.S. Pat. No. 6,850,481, issued Feb. 1, 2005, and entitled "Channels Estimation For Multiple Input-Multiple Output, Orthogonal Frequency Division Multiplexing (OFDM) System". This application incorporates its subject matter by reference with respect to channel estimation.

BACKGROUND OF THE INVENTION

1. Field of the Invention

The invention relates to adapting time diversity and spatial diversity for use in an orthogonal frequency-division multiplexing (OFDM) environment, using a multiple input and multiple output (MIMO) structure.

2. Discussion of Related Art

A multiple input, multiple output (MIMO) structure has multiple communication channels that are used between transmitters and receivers. A space time transmitter diversity (STTD) system may be used on a MIMO structure, but it will not increase the data throughput. For a high level configuration, the data rate may even reduce. In an STTD system, the transmitters deliver the same information content within consecutive symbol duration so that time diversity may be exploited. To efficiently use the multiple transmitters of the MIMO structure, however, the transmission data rate needs to be increased.

The most straightforward solution to increase the transmission data rate is to dump independent data to each transmitter while applying forward error correction (FEC). A forward error correction (FEC) encoder produces in-phase and quadrature-phase data streams for the digital QAM modulator in accordance with a predetermined QAM constellation. The QAM modulator may perform baseband filtering, digital interpolation and quadrature amplitude modulation. The output of the QAM modulator is a digital intermediate frequency (IF) signal. A digital to analog (D/A) converter transforms the digital IF signal to analog for transmission.

A problem arises, however, as to how to safely recover the transmitted data. For a 2×2 system (two transmitters, two receivers) for example, after the channel information is obtained, the recovery process entails formulating two equations with two unknowns that need to be solved. The two unknowns may be determined only if the 2×2 channel is invertible. In practice, however, two situations may be encountered, i.e., the channel matrix is rank deficient so the unknowns cannot be determined or the frequency response channel matrix is invertible but has a very small eigen value.

The first situation arises when the channels are highly correlated, which may be caused either by not enough separation of the transmitters or by homology of the surroundings. For the second situation, although the equations are solvable, the solution can cause a high bit error rate (BER), because a scale up of the noise can result in an incorrect constellation point.

Orthogonal frequency-domain multiplexing (OFDM) systems were designed conventionally for either time diversity or for space diversity, but not both. The former will provide a robust system that combats signal fading but cannot increase the data rate capacity, while the latter can increase the data rate capacity but loses the system robustness. An OFDM signal contains OFDM symbols, which are constituted by a set of sub-carriers and transmitted for a fixed duration.

The MIMO structure may be used for carrying out time diversity for an OFDM system. For instance, when one transmitter transmits an OFDM signal, another transmitter will transmit a fully correlated OFDM signal to that transmitted by the one transmitter. The same OFDM signal is transmitted with, for instance, a fixed OFDM duration.

On the other hand, spatial diversity entails transmitting independent signals from different transmitters. Thus, transmitting two independent OFDM signals from two transmitters, respectively, results in a double data rate capacity from the parallel transmission that occurs.

When the signal to noise ratio (SNR) is low, the frame error rate (FER) is large, so that a data packet transmission will be decoded incorrectly and will need to be retransmitted. The quality of service (QoS) defines the number of times that the same packet can be retransmitted, e.g., within an OFDM architecture. The OFDM system on a MIMO structure, therefore, should be adaptable to ensure that the QoS is maintained.

For any given modulation and code rate, the SNR must exceed a certain threshold to ensure that a data packet will be decoded correctly. When the SNR is less than that certain threshold, the bit error rate (BER) is larger, which results in a larger FER. The larger the FER, the more retransmissions of the same packet will be required until the packet is decoded correctly. Thus, steps may need to be taken to provide the OFDM system with a higher gain. If the SNR is at or above the threshold, then there is no need to increase the gain of the architecture to decode the data packets correctly. One challenge is to adapt the OFDM system to use time diversity when signal fading is detected as problematic and to use spatial diversity at other time to increase the data rate transfer.

In a conventional OFDM system, there are many OFDM modes, for examples are the 1 k mode (1024 tones) and the half k mode (512 tones). For 1 k mode, the number of sub-carriers is 1024 and for the half k mode, the number of sub-carriers is 512. The 1 k mode is suitable for a channel with long delay and slow temporal fading, while the 512 mode is suitable for the channel with a short delay and fast temporal fading. But which mode will be used is really depending on the real environment.

A transaction unit of a conventional OFDM signal is an OFDM frame that lasts 10 ms. Each OFDM frame consists of 8 OFDM slots and each slot lasts 1.25 ms. Each OFDM slot consists of 8 OFDM symbols and some of the OFDM symbols will be the known preambles for access and channels estimation purposes. An OFDM super frame is made up of 8 OFDM frames and lasts 80 ms.

In addition to transmitted data, an OFDM frame contains a preamble, continual pilot sub-carriers, and transmission parameter sub-carriers/scattered sub-carriers. The preamble contains OFDM symbols that all used for training to realize timing, frequency and sampling clock synchronization acquisitions, channel estimation and a C/I calculation for different access points. The continual pilot sub-carriers contain training symbols that are constant for all OFDM symbols. They are used for tracking the remaining frequency/sampling clock offset after the initial training.

The transmission parameter sub-carriers/scattered sub-carriers are dedicated in each OFDM symbol and reserved for signaling of transmission parameters, which are related to the transmission scheme, such as channel coding, modulation, guarding interval and power control. The transmission parameter sub-carriers are well protected and therefore can be used as scattered pilot sub-carriers after decoding.

One application for determining whether sub-carriers should be assigned to time diversity or spatial diversity is to conform to statistical analysis of traffic demands during particular times of the day, such as peak and off-peak. The OFDM system may preferably bias toward either time diversity or spatial diversity based on such a statistical analysis.

BRIEF SUMMARY OF THE INVENTION

One aspect of the invention pertains to employing adaptive STTD and spatial multiplexing (SM) based on comparing the channel condition of each sub-carrier with a threshold. When a sub-carrier is accommodated on channels that have a "well conditioned" channel matrix, spatial multiplexing may be used to create independent transmission paths and therefore increase the data rate. A "well conditioned" channel matrix arises when the smallest eigen value is not too small as compared to a threshold value, such as the noise power increase when multiplied by its inverse. For those sub-carriers whose channel matrices have smaller eigen values, the receiver cannot recover the parallel transmitted information symbols. As a result, STTD is used to guarantee a robust system.

Encoders associated with the transmitter side encode or classify sub-carriers in accordance with one of two groups based on a feedback signal; one of the groups is to forward error correction (FEC) time diversity and the other of the two groups is to forward error correction (FEC) spatial diversity. This grouping is based on results from a comparison made at the receiver side between a threshold value and either a calculated smallest eigen value of a frequency response matrix, the smallest element in a diagonal of the matrix, or a ratio of the largest and smallest eigen values in the matrix.

The threshold value is based on the transmitter and receiver antenna configuration, environmental constraints of the OFDM communication system, and/or on statistical analysis of communication traffic demands. The estimate value is derived from channel estimation of multiple channels of multi-input multi-output (MIMO) type systems.

Time diversity is used to reduce adverse signal fading. Spatial diversity is used to increase the data rate, which time diversity cannot do. When sub-carriers use time diversity, it means that signal fading is strong so that parallel transmission of data packets can not be done to overcome the insufficient gain problem. Instead, time diversity is used to get the necessary gain for the OFDM system, even though the data rate capacity suffers. An SNR gain is assured with time diversity, because of the orthogonality matrix pattern inherent among transmitted samples in the OFDM system. On the other hand, when sub-carriers use spatial diversity, signal fading is weak so that parallel transmissions may occur to increase the data rate capacity. Thus, there is no need to increase the gain of the OFDM system, which means that the data rate may be increased.

In operation, the OFDM system of the invention may start transmission of data packets with either time diversity or spatial diversity. The receiver side will estimate the channels and decode the data packets. After the channel information, is obtained, the receiver side will calculate the eigen values of the channel matrices to the extent possible. The controller then determines whether the sub-carrier to use time diversity or spatial diversity based on one of three criteria (only one of which is dependent upon the eigen value calculation). The receiver then reports back or feedbacks to the transmitter side with this information, i.e., about whether the sub-carrier is to use time diversity or spatial diversity so as to trigger the next round of transmission accordingly.

BRIEF DESCRIPTION OF THE DRAWINGS

For a better understanding of the present invention, reference is made to the following description and accompanying drawings, while the scope of the invention is set forth in the appended claims.

FIG. 2 is a schematic representation of an orthogonal frequency-division multiplexing symbol.

FIG. 3 is a space time transmitter diversity (STTD) orthogonal frequency-division multiplexing (OFDM) encoder for loading data to a sub-carrier in G1 which will be specified in the forthcoming sections.

DETAILED DESCRIPTION OF THE INVENTION

The invention concerns a practical time and spatial diversity combination that fits into an OFDM system. The OFDM system of the invention can automatically adapt the channel variation and make trade off between time diversity and spatial diversity. In an exemplary environment, the data rate can be increased 1.8 times for 2×2 configuration (2 transmitters, 2 receivers), which gives 80 Mbps, and 2.7 times for 3×3 configuration) 3 transmitters, 3 receivers) which gives 121 Mbps within 6 MHz, while keep the robustness of the system.

Figure 1:
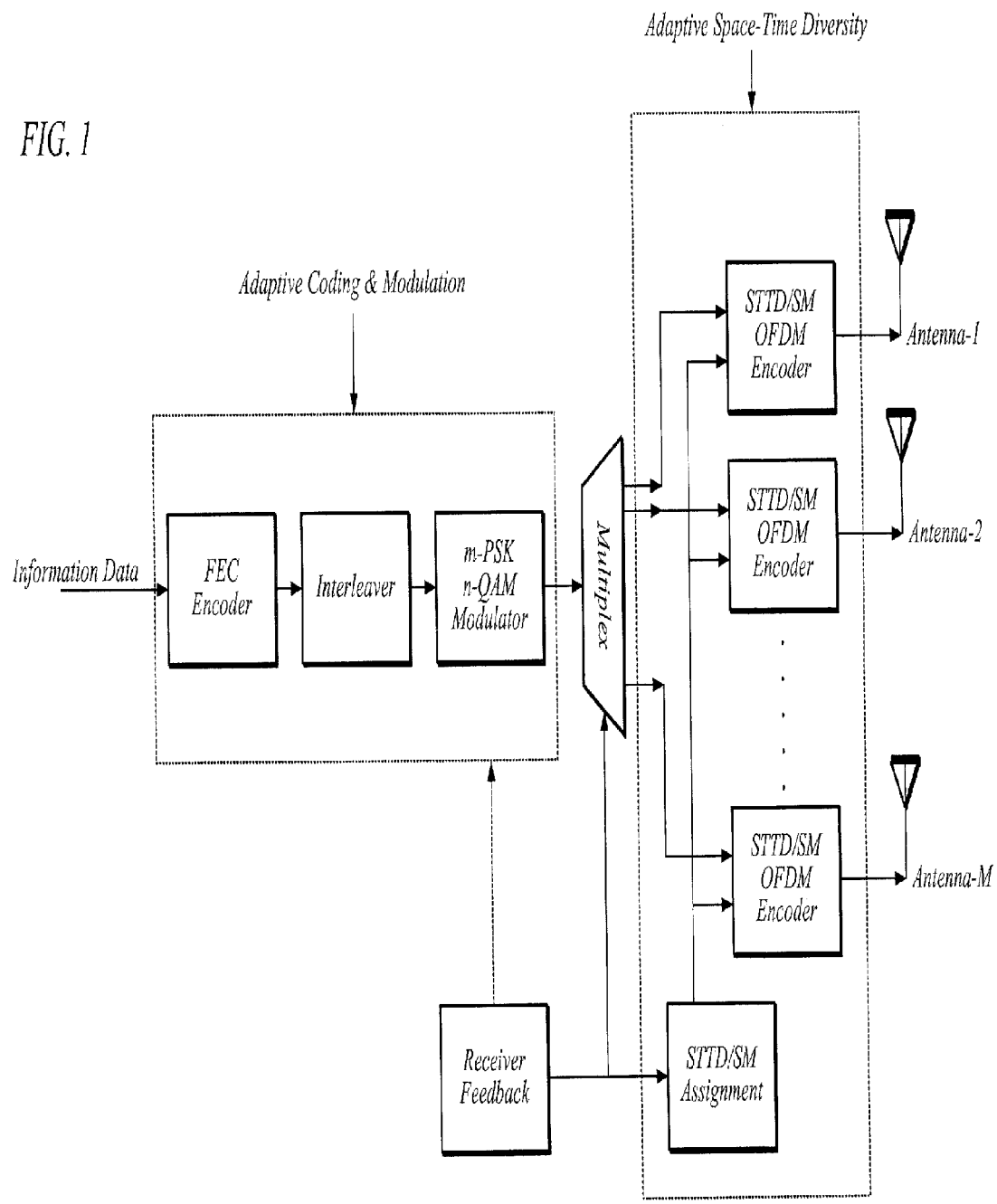
FIG. 1 is a schematic representation of a generic multi-input, multi-output orthogonal frequency-division multiplexing transmitter in accordance with an embodiment of the invention.

Turning to the drawing, FIG. 1 shows a generic MEMO and OFDM transmitter system. In the figure, STTD and SM are the abbreviations of Space-Time-Transmitter Diversity and Spatial Multiplexing. The MIMO OFDM is configured as two level adaptations as shown in FIG. 1, namely, space/time diversity adaptation and coding/modulation adaptation. The space/time diversity adaptation is determined by the carrier to interference power ratio or signal to noise power ratio.

Information data is fed into adaptive coding modulation; the modulation is multiplexed and fed into adaptive space/time diversity encoding and assignment. A receiver feedback to provide feedback signals to the adaptive coding of modulation, multiplexer and adaptive space/time diversity is also provided. The multiplexed signals in the adaptive space/time diversity pass through STTD/SM OFDM encoders and the encoded signals transmit to associated antennas. The adaptive coding and modulation includes a forward error correction (FEC) encoder, an interleaver and an m-PSK modular.

If x MHz bandwidth is available, then Orthogonal Frequency Division Multiplexing OFDM is to chop this whole spectrum into many small pieces of equal width and each of them will be used as a carrier. The width of the piece will be determined by delay spread of the targeted environment.

The STTD/OFDM encoder is responsible for the assignment of the constellation points to each sub-carrier. For M transmitters, M OFDM symbols data are loaded in general (so the bit loading will be calculated according to this number), but it will depend on the STTD structure. FIG. 2 illustrates one OFDM symbol.

For each sub-carrier that is indexed k, its loading will be determined by its corresponding channel condition. For N receivers, the frequency channel responses may be represented by an M×N matrix, say H(k), The channel condition will be described by one of the following 3 criteria.

1. Smallest eigen value of H(k)H(k)*
2. Smallest element of the diagonal of H(k)H(k)*
3. The ratio of largest and smallest eigen values of H(k)H(k)*

A set of thresholds for each criterion and for each system configuration is used. These thresholds will be service parameters and can be used as quality of service (QoS) or billing purposes.

With each criterion and a given threshold, all the sub-carriers will be classified into two groups G1 and G2 by a controller at the receiver side. The controller directs the transmission of a feedback signal indicative of the result of the classification. The feedback signal is received at the transmitter side and interpreted by a controller at the transmitter side. The sub-carriers classified in G1 will use STTD encoder at the transmission side while those classified in G2 will use the SM encoder at the transmission side.

After the sub-carriers have been classified into the two groups G1 and G2, the modulation scheme on each sub-carrier will be determined by the estimated C/I (carrier to interference ratio) or SNR (signal to noise ratio). As a result, a modulation scheme, such as QPSK or m-PSK or various QAM, will be selected to satisfy QoS (quality of service) based on the determination made by the estimated C/I or SNR. This is another level adaptation that may maximize the throughput gain.

For instance, when the QoS is defined, the FER (frame error rate) may be ten percent. The goal is to choose a modulation scheme according to the perceived C/I or SNR to satisfy this QoS, yet still maximizing the throughput of data flow. To achieve this, a pre-defined look-up table may be accessed that is in accordance with various QoS.

In determining which modulation scheme will satisfy the criteria, the C/I or SNR estimation is done during mobile access, after looking for the strongest signal from the base station first. Based on such knowledge and estimation, one is able to get a rough idea as to which modulation scheme should be used. Regardless of the modulation scheme selected initially, the invention is configured to automatically adapt toward whichever modulation scheme represents the optimal modulation.

FIG. 3 shows how to load data on sub-carrier k for a situation involving 2 transmitters for example. This data loading is done within a pair of OFDM symbols. As can be appreciated, apparently one sample has been transmitted twice within 2 OFDM symbols duration via 2 transmitters. Thus, the data rate is the same as for the one transmitter OFDM system.

Figure 4:
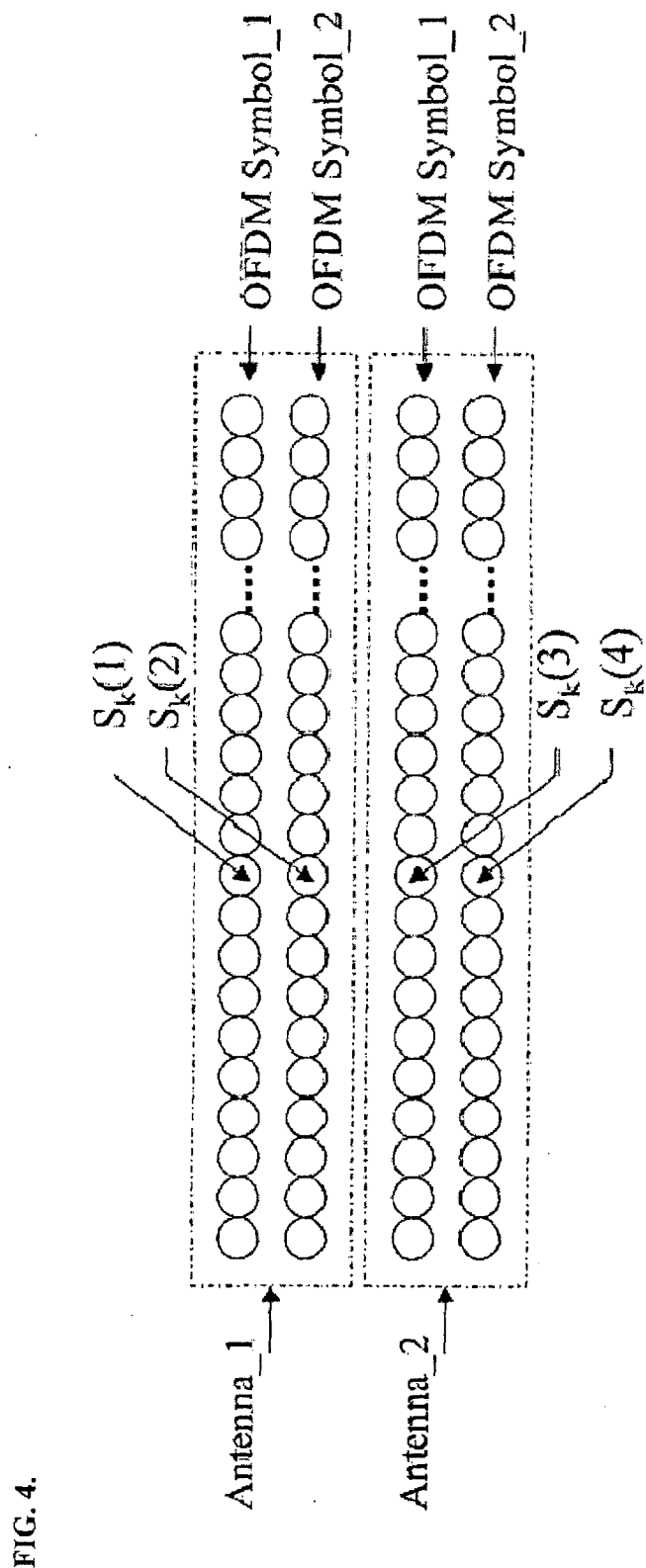
FIG. 4 is a spatial multiplexing (SM) orthogonal frequency-division multiplexing (OFDM) encoder for loading data to a sub-carrier in G2 which will be specified in the forthcoming sections.

FIG. 4 shows how to load data on sub-carrier k in G2 for a situation involving 2 transmitters. In this case, each transmitter transmits independent data and therefore the data rate is double for 2 transmitters and M times for M transmitters.

The adaptive time diversity and spatial diversity for OFDM works as follows. Starting out, an STTD mode is used for all sub-carriers. The receiver estimates the channel profiles and then directs a feedback of its preference either to STTD or spatial multiplexing (SM) on each sub-carrier.

The whole sub-carrier indices $\{K_{min}, K_{min}+1, \ldots, K_{max}\}$ are then divided into two disjoint subsets $I_{sttd}$ and $I_{sm}$. The one with fewer elements will be the feedback to the transmitters. The extreme case is that one of them is an empty set, which means use of either pure STTD or pure SM. As in the pure STTD system, the transmitters always consider two OFDM symbols as the basic transmission unit for 2×2 configuration and M OFDM symbols for a system has M transmitters.

The number of input bits, however, needs to be calculated according to a modulation scheme and a dynamic distribution of $I_{sttd}$ and $I_{sm}$. More precisely, the number of bits needed for the two consecutive OFDM symbols is $2 \times |I_{sttd}| L + 4 \times |I_{sm}| L$, where L is the modulation level which equals to 2, 3, 4 5, 6, 7, 8.

When a granularity problem arises, the two OFDM symbols are repacked to fit the granularity by removing some sub-carriers from $I_{sm}$ into $I_{sttd}$. This may sacrifice the data rate somewhat, but keep the system robust.

In the receiver side, a quadrature amplitude modulation QAM de-mapping block is used to de-map the received data according to $I_{sttd}$ and $I_{sm}$.

STTD is the baseline of the service quality. This means that when parallel transmission is carried out in the designated communication channels, then it is guaranteed parallel transmission, because the BER or FER will be controlled to achieve the necessary QoS. The transmitters will propagate the transmissions at the same constant power and the modulation will be the same for each transmitter. Thus, no power pouring technique needs to be employed.

Three thresholds are used to classify the sub-carriers. Indeed, the threshold can be used as s service parameter and tuned aggressive to either STTD mode or SM mode according to customer demand, i.e., based on statistical analysis of that demand.

As an example, for the case where the smallest eigen value is used as the threshold in a 2×2 configuration (2 transmitters, 2 receivers), there is a 60% opportunity to do parallel transmission with 0.5 as the threshold value, which may be scale the noise 3 dB up. For a 2×4 configuration (2 transmitters, 4 receivers), there is an 80% opportunity to do parallel transmission with 1 as the threshold value, which may even reduce the noise.

Figure 5:
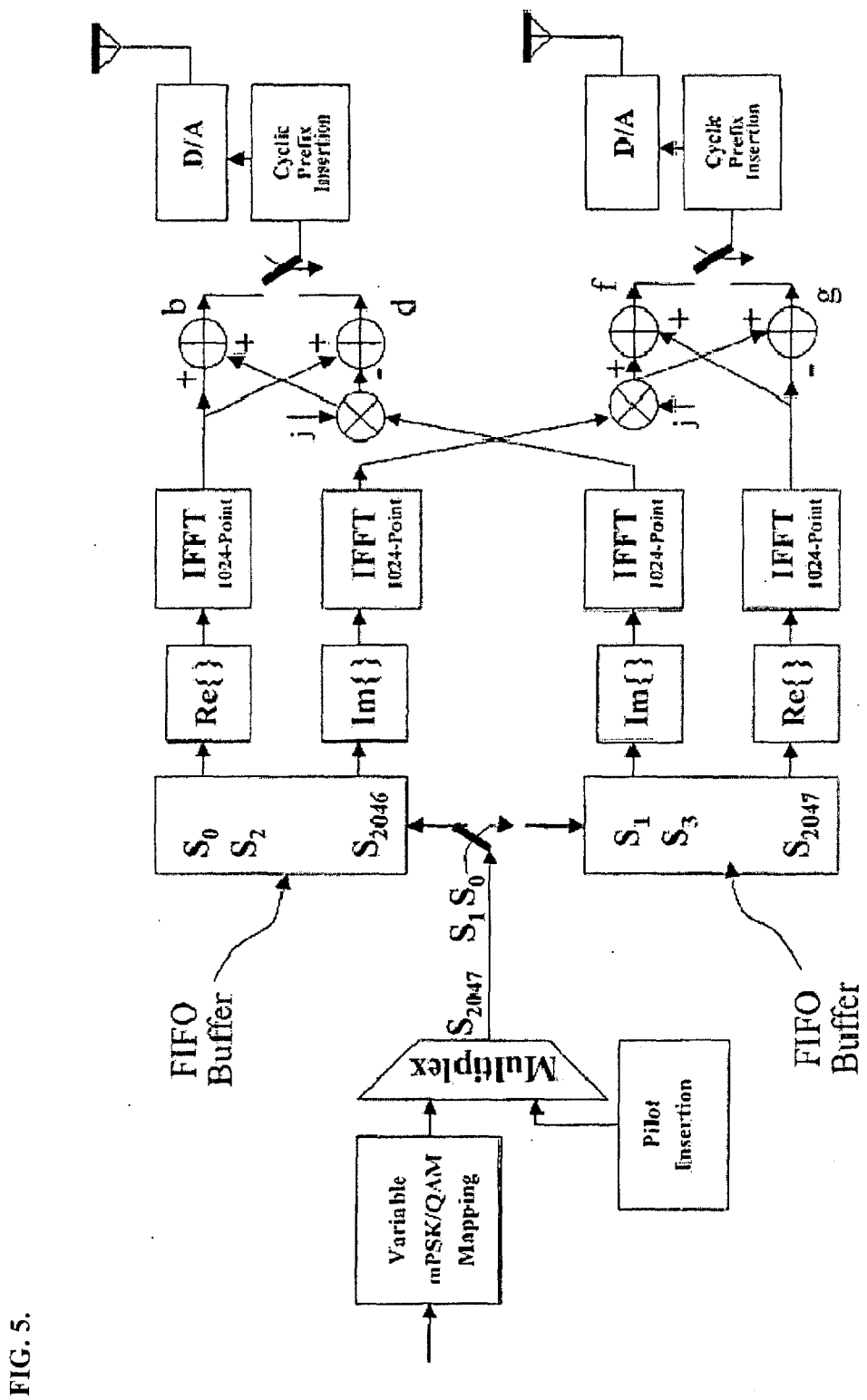
FIG. 5 is a schematic representation of two pure STTD transmitters that save one half of the IFFT computation.

FIG. 5 shows a special, but very practical situation, which shows two pure STTD transmitters that save ½ of an inverse fast Fourier transform (IFFT) computation. The present invention may automatically switch to this scenario in a vulnerable environment involving 2 transmitters.

Conventionally, one would expect each transmitter to transmit 2 OFDM symbols every 2 OFDM symbol duration. Thus, there are 4 OFDM symbols transmitted for every 2 OFDM duration that go through a respective independent IFFT computation engine. This means that a complex number IFFT computation is expected to be conducted four times.

Figure 6:
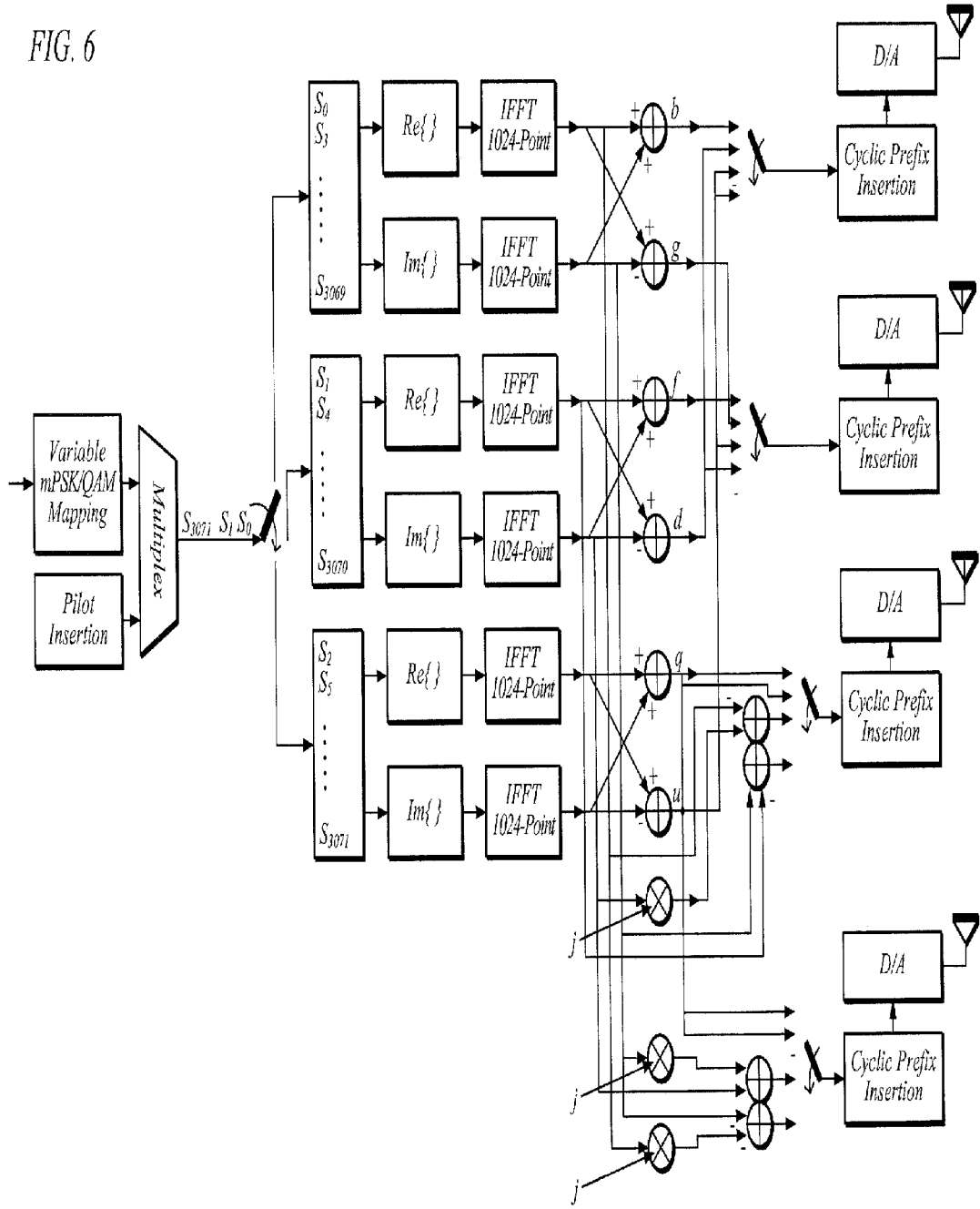
FIG. 6 is a schematic representation of four pure STTD transmitters that save three fourths of the IFFT computation.

For a pure STTD implementation with 2 and 4 transmit antennas, the computational efficient implementation is shown in FIGS. 5 and 6 respectively. The scheme in FIG. 5 requires ½ of the IFFT computation and the scheme in FIG. 6 requires ¼ of the IFFT computation as compared with a straightforward implementation that performs the computations separately.

In accordance with FIG. 5, however, there is data crossing between two transmitters, which saves two IFFT computations. Yet, it provides four IFFT outputs, which is exactly the same results where four independent IFFTs are used.

Although four IFFT operations are shown in FIG. 5, they are operating on real vectors, which means the computational complexity of a real IFFT equals the complex IFFT with a half size. Therefore, the computational time saving comes from the relationship between IFFT on a vector and its conjugate.

In FIG. 5, the bits are coded bits, which are the input to variable M-PSK/QAM mapping. The mapping will map the bits to the corresponding constellation points according to the Gray rule; constellation points here refer to any modulation scheme, such as QPSK, m-PSK, QAM, etc. The constellation vector will be inserted with a pilot into a multiplex and then into first in first out (FIFO) buffers.

The designations $S_0$, $S_1$, $S_2$, $S_3$, $S_{2046}$, $S_{2047}$, in the FIFO buffer represent complex vectors. The function Re{ } refers to just taking the real part of the complex vector. The designation Im{ } refers to just taking the imaginary part of the complex vector. The real and imaginary parts are fed as input into IFFTs. The designation D/A refers to a digital to analog converter.

The transmission order for the first transmitter is OFDM symbol b and then d . . . ; the transmission order for the second transmitter is OFDM symbol g and then f etc. Before each OFDM symbol is transmitted, the cyclic extension will be appended somewhere in the OFDM symbol.

Periodically inserted preambles will serve for the timing recovery, framing, frequency offset estimation, clock correction and overall channel estimation The estimated channel samples will be used for the continuous spectrum channel reconstruction. Pilot symbols will serve for phase correction, final tuning of channel estimation.

The Mathematical equivalence for FIG. 5 is as follows.

$$b = IFFT \begin{bmatrix} S_0 \\ S_2 \\ \vdots \\ S_{2046} \end{bmatrix},$$

$$d = IFFT \begin{bmatrix} -S_1^* \\ -S_3^* \\ \vdots \\ -S_{2047}^* \end{bmatrix},$$

$$f = IFFT \begin{bmatrix} S_1 \\ S_3 \\ \vdots \\ S_{2047} \end{bmatrix},$$

$$g = IFFT \begin{bmatrix} S_0^* \\ S_2^* \\ \vdots \\ S_{2046}^* \end{bmatrix}$$

FIG. 6 shows four Pure STTD Transmitters that represents a rate ¾ STTD encoder as:

| Tx1 | $S(0)$ | $-S(1)^*$ | $S(2)^*$/sqrt(2) | $S(2)$/sqrt(2) |
|---|---|---|---|---|
| Tx2 | $S(1)$ | $S(0)^*$ | $S(2)^*$/sqrt(2) | $-S(2)$/sqrt(2) |
| Tx3 | $S(2)$/sqrt(2) | $S(2)$/sqrt(2) | $-\text{Re}\{S(0)\}+j\text{Im}\{S(1)\}$ | $-\text{Re}\{S(1)\}+j\text{Im}\{S(0)\}$ |
| Tx4 | $S(2)$/sqrt(2) | $S(2)$/sqrt(2) | $\text{Re}\{S(1)\}+j\text{Im}\{S(0)\}$ | $-\text{Re}\{S(0)\}-j\text{Im}\{S(1)\}$ |
| Time | [0 T] | [T 2T] | [2T 3T] | [3T 4T] |

Such an STTD encoder encodes every 3 OFDM symbols into 4 OFDM symbols and transmits to 4 antennas. FIG. 6 scheme requires ¼ IFFT computation compared to the straightforward implementation. The reason why computation is saved is for the same reasons as in FIG. 5. The parameters there are defined respectively as follows:

$$b = IFFT \begin{bmatrix} S_0 \\ S_3 \\ \vdots \\ S_{3069} \end{bmatrix}, g = IFFT \begin{bmatrix} S_0^* \\ S_3^* \\ \vdots \\ S_{3069}^* \end{bmatrix}$$

$$f = IFFT \begin{bmatrix} S_1 \\ S_4 \\ \vdots \\ S_{3070} \end{bmatrix}, d = IFFT \begin{bmatrix} S_1^* \\ S_4^* \\ \vdots \\ S_{3070}^* \end{bmatrix}$$

$$q = IFFT \begin{bmatrix} S_2 \\ S_5 \\ \vdots \\ S_{3071} \end{bmatrix}, u = IFFT \begin{bmatrix} S_2^* \\ S_5^* \\ \vdots \\ S_{3071}^* \end{bmatrix}$$

Figure 7:
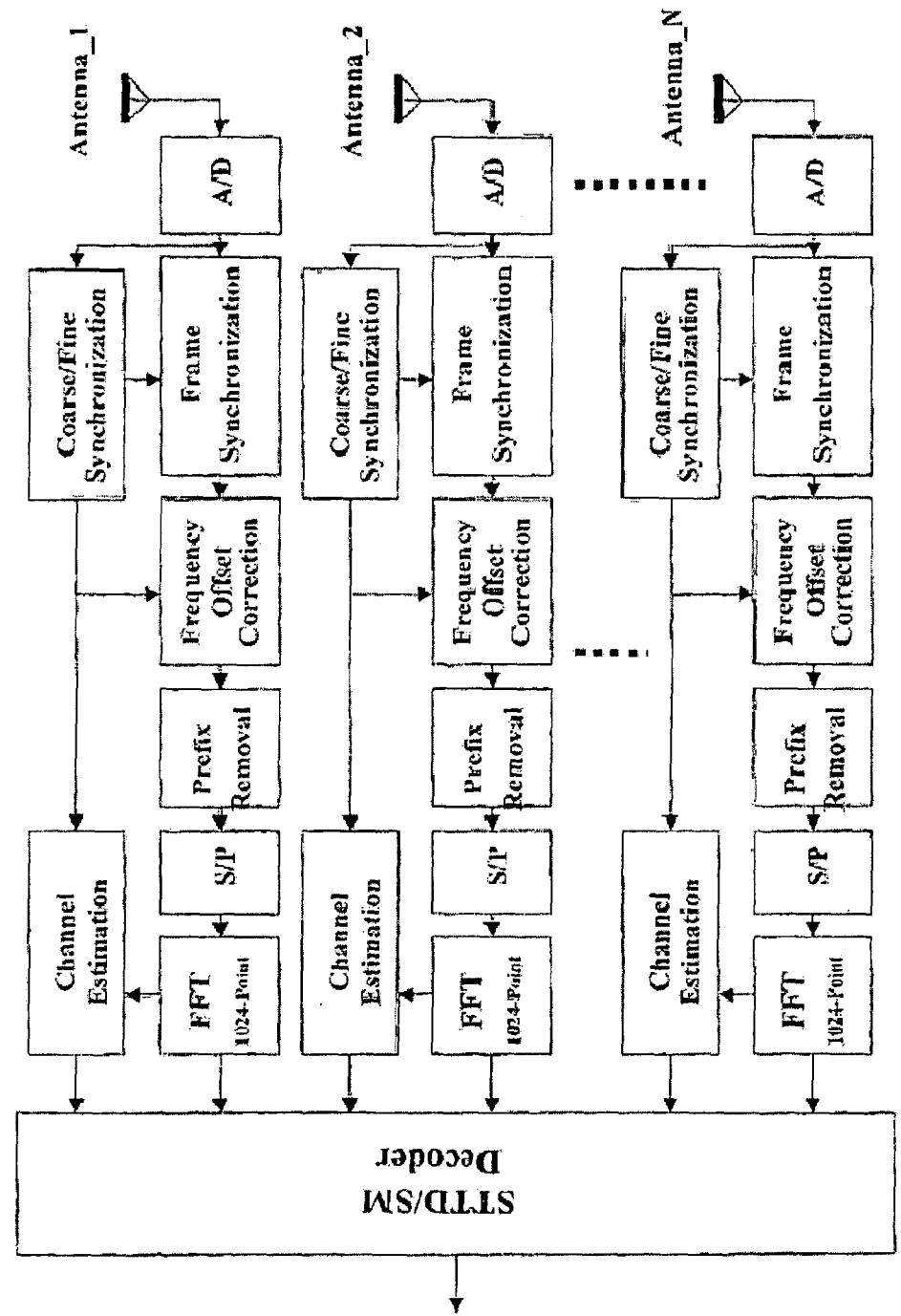
FIG. 7 is a schematic representation a generic receiver structure.

FIG. 7 is an abstract diagram of a generic receiver structure. STTD/SM OFDM decoder is sub-carrier based decoder. The structure and configuration of the STTD/SM OFDM decoder will depend on the architecture configuration.

Suppose sub-carrier m is STTD coded, i.e. m belongs to G1. For a 2×2 configuration:

$S(2m)$ and $S(2m+1)$ are decoded by solving the following equations $$\begin{bmatrix} y_1(q,m) \\ y_1(q+1,m)^* \end{bmatrix} = \begin{bmatrix} h_{11}(q,m) & h_{21}(q,m) \\ h_{21}(q,m)^* & -h_{11}(q,m)^* \end{bmatrix} \begin{bmatrix} s(2m) \\ s(2m+1) \end{bmatrix} + \begin{bmatrix} n_1(q,m) \\ n_1(q+1,m) \end{bmatrix}$$

The assumption here is that the even indexed sample $S(2m)$ is transmitted in qth OFDM and the odd indexed sample $S(2m+1)$ is transmitted in (q+1)th OFDM symbol.

There are 4 equations and two unknowns. So a least mean square solution can be obtained by multiplying the coefficient matrix to the received data vector. With the above two pairs, we will get two estimated of the same pair of samples. Their average will be the output of the decoder.

More statistics are performed after regrouping the equations. In fact, every pair of the equations will result a solution, every 3 equations also provide a new estimation, and all the equations will give a solution too. There are 10 combinations in total and therefore 10 estimation with these 4 equations. Their average or partial average will be used as the solution.

A 2×3 configuration is similar to 2×2, involving 6 equations:

$$\begin{bmatrix} y_1(q,m) \\ y_1(q+1,m)^* \end{bmatrix} = \begin{bmatrix} h_{11}(q,m) & h_{21}(q,m) \\ h_{21}(q,m)^* & -h_{11}(q,m)^* \end{bmatrix}$$

$$\begin{bmatrix} s(2m) \\ s(2m+1) \end{bmatrix} + \begin{bmatrix} n_1(q,m) \\ n_1(q+1,m) \end{bmatrix}$$

$$\begin{bmatrix} y_2(q,m) \\ y_2(q+1,m)^* \end{bmatrix} = \begin{bmatrix} h_{12}(q,m) & h_{22}(q,m) \\ h_{22}(q,m)^* & -h_{12}(q,m)^* \end{bmatrix}$$

$$\begin{bmatrix} s(2m) \\ s(2m+1) \end{bmatrix} + \begin{bmatrix} n_2(q,m) \\ n_2(q+1,m) \end{bmatrix}$$

$$\begin{bmatrix} y_3(q,m) \\ y_3(q+1,m)^* \end{bmatrix} = \begin{bmatrix} h_{12}(q,m) & h_{23}(q,m) \\ h_{23}(q,m)^* & -h_{13}(q,m)^* \end{bmatrix}$$

$$\begin{bmatrix} s(2m) \\ s(2m+1) \end{bmatrix} + \begin{bmatrix} n_3(q,m) \\ n_3(q+1,m) \end{bmatrix}$$

For a 2×4 configuration, there are 8 equations:

$$\begin{bmatrix} y_1(q,m) \\ y_1(q+1,m)^* \end{bmatrix} = \begin{bmatrix} h_{11}(q,m) & h_{21}(q,m) \\ h_{21}(q,m)^* & -h_{11}(q,m)^* \end{bmatrix}$$

$$\begin{bmatrix} s(2m) \\ s(2m+1) \end{bmatrix} + \begin{bmatrix} n_1(q,m) \\ n_1(q+1,m) \end{bmatrix}$$

$$\begin{bmatrix} y_2(q,m) \\ y_2(q+1,m)^* \end{bmatrix} = \begin{bmatrix} h_{12}(q,m) & h_{22}(q,m) \\ h_{22}(q,m)^* & -h_{12}(q,m)^* \end{bmatrix}$$

$$\begin{bmatrix} s(2m) \\ s(2m+1) \end{bmatrix} + \begin{bmatrix} z_2(q,m) \\ z_2(q+1,m) \end{bmatrix}$$

$$\begin{bmatrix} y_3(q,m) \\ y_3(q+1,m)^* \end{bmatrix} = \begin{bmatrix} h_{13}(q,m) & h_{23}(q,m) \\ h_{23}(q,m)^* & -h_{13}(q,m)^* \end{bmatrix}$$

$$\begin{bmatrix} s(2m) \\ s(2m+1) \end{bmatrix} + \begin{bmatrix} n_3(q,m) \\ n_3(q+1,m) \end{bmatrix}$$

$$\begin{bmatrix} y_4(q,m) \\ y_4(q+1,m)^* \end{bmatrix} = \begin{bmatrix} h_{14}(q,m) & h_{24}(q,m) \\ h_{24}(q,m)^* & -h_{14}(q,m)^* \end{bmatrix}$$

$$\begin{bmatrix} s(2m) \\ s(2m+1) \end{bmatrix} + \begin{bmatrix} n_4(q,m) \\ n_4(q+1,m) \end{bmatrix}$$

For a 4×2 configuration, there are 8 equations and 3 unknowns $$\begin{bmatrix} y_1(q,m) \\ y_1(q+1,m) \\ y_1(q+2,m) \\ y_1(q+3,m) \end{bmatrix} = \begin{bmatrix} s(3m-3) & s(3m-2) & \frac{s(3m-1)}{\sqrt{2}} & \frac{s(3m-1)}{\sqrt{2}} \\ -s(3m-2)^* & s(3m-3)^* & \frac{s(3m-1)}{\sqrt{2}} & -\frac{s(3m-1)}{\sqrt{2}} \\ \frac{s(3m-1)^*}{\sqrt{2}} & \frac{s(3m-1)^*}{\sqrt{2}} & \eta(m) & \kappa(m) \\ \frac{s(3m-1)^*}{\sqrt{2}} & -\frac{s(3m-1)^*}{\sqrt{2}} & v(m) & \zeta(m) \end{bmatrix}$$

$$\begin{bmatrix} h_{11}(m) \\ h_{21}(m) \\ h_{31}(m) \\ h_{41}(m) \end{bmatrix} + \begin{bmatrix} n_{11} \\ n_{21} \\ n_{31} \\ n_{41} \end{bmatrix}$$

where
$\eta(m) = -\text{Re}(s(3(m-1))) + j\text{Im}(s(3(m-1)+1))$,
$\kappa(m) = -\text{Re}(s(3(m-1)+1)) + j\text{Imag}(s(3(m-1)))$,
$v(m) = \text{Re}(s(3(m-1)+1)) + j\text{Im}(s(3(m-1))), \zeta(m) = -\text{Re}(s(3(m-1))) - j\text{Imag}(s(3(m-1)+1))$, $h_{k1}(m)$ is the frequency channel response of the channel between transmitter k and receiver 1.

Similarly, the received data for the 4×2 configuration is $$\begin{bmatrix} y_2(q,m) \\ y_2(q+1,m) \\ y_2(q+2,m) \\ y_2(q+3,m) \end{bmatrix} = \begin{bmatrix} s(3m-3) & s(3m-2) & \frac{s(3m-1)}{\sqrt{2}} & \frac{s(3m-1)}{\sqrt{2}} \\ -s(3m-2)^* & s(3m-3)^* & \frac{s(3m-1)}{\sqrt{2}} & -\frac{s(3m-1)}{\sqrt{2}} \\ \frac{s(3m-1)^*}{\sqrt{2}} & \frac{s(3m-1)^*}{\sqrt{2}} & \eta(m) & \kappa(m) \\ \frac{s(3m-1)^*}{\sqrt{2}} & -\frac{s(3m-1)^*}{\sqrt{2}} & v(m) & \zeta(m) \end{bmatrix}$$

$$\begin{bmatrix} h_{12}(m) \\ h_{22}(m) \\ h_{32}(m) \\ h_{42}(m) \end{bmatrix} + \begin{bmatrix} n_{11} \\ n_{21} \\ n_{31} \\ n_{41} \end{bmatrix}$$

The solution will be the least mean square solution by enumerating all possibilities.

Suppose instead that sub-carrier m is SM Coded, i.e. m belongs to G2. For a 2×2 configuration, there are 4 equations and 4 unknowns:

$$\begin{bmatrix} y_1(q,m) \\ y_2(q,m) \end{bmatrix} = \begin{bmatrix} h_{11}(q,m) & h_{21}(q,m) \\ h_{12}(q,m) & h_{22}(q,m) \end{bmatrix} \begin{bmatrix} s(2m) \\ s(2m+1) \end{bmatrix} + \begin{bmatrix} n_1(q,m) \\ n_1(q,m) \end{bmatrix}$$

$$\begin{bmatrix} y_1(q+1,m) \\ y_2(q+1,m)^* \end{bmatrix} = \begin{bmatrix} h_{11}(q,m) & h_{21}(q,m) \\ h_{12}(q,m) & h_{22}(q,m) \end{bmatrix} \begin{bmatrix} s(2m+2) \\ s(2m+3) \end{bmatrix} + \begin{bmatrix} n_2(q+1,m) \\ n_2(q+1,m) \end{bmatrix}$$

So the 4 unknowns can be estimated by the least mean square solutions. For a 2×3 configuration, there are 6 equations and 4 unknowns.

$$\begin{bmatrix} y_1(q,m) \\ y_2(q,m) \\ y_3(q,m) \end{bmatrix} = \begin{bmatrix} h_{11}(q,m) & h_{21}(q,m) \\ h_{12}(q,m) & h_{22}(q,m) \\ h_{13}(q,m) & h_{23}(q,m) \end{bmatrix} \begin{bmatrix} s(2m) \\ s(2m+1) \end{bmatrix} + \begin{bmatrix} n_1(q,m) \\ n_2(q,m) \\ n_3(q,m) \end{bmatrix}$$

$$\begin{bmatrix} y_1(q+1,m) \\ y_2(q+1,m) \\ y_3(q+1,m) \end{bmatrix} = \begin{bmatrix} h_{11}(q+1,m) & h_{21}(q+1,m) \\ h_{12}(q+1,m) & h_{22}(q+1,m) \\ h_{13}(q+1,m) & h_{23}(q+1,m) \end{bmatrix}$$

$$\begin{bmatrix} s(2m+2) \\ s(2m+3) \end{bmatrix} + \begin{bmatrix} n_1(q+1,m) \\ n_2(q+1,m) \\ n_3(q+1,m) \end{bmatrix}$$

For a 2×4 configuration, there are 8 equations and 4 unknowns. For a 3×3 configuration, there are 9 equations and 9 unknowns.

In accordance with the inventive architecture, the data rate can be as high as 70 Mbps for 2×2 and 120 Mbps for 3×3 within 6 MHz spectrum.

An exemplary optimal threshold value for a 2×2 configuration is 0.5. An exemplary optimal threshold value for a 2×4 configuration is 1.0. An exemplary optimal threshold value for a 3×3 configuration is 1.2. An exemplary optimal threshold value for a 2×3 configuration is 1.0. By exemplary optimal threshold value, the intent is to attain a value that has a trade-off between time and spatial diversity that yields both a relatively high robustness and relatively high data packet rate transfer.

As can be appreciated for each of the afore-mentioned configurations, there are a certain number of equations and a certain number of unknowns. In an over-determined system, the number of equations is greater than the number of unknowns. Thus, for a 2×2 configuration, there are two unknowns but four equations may be formulated. If there is no noise, any two of them (six pairs), or any three of them (four triples) or all of the four equations (one quadratic) will give the same answer. The difference is when noise is present, because the combinations with then give different solutions. Since some of the solutions may be good while others are bad, different combinations are chosen, but those combinations that result in large derivations are to be avoided. The idea is to use a sub-set of the over determined linear equations to estimate the solution and then average all the possible solutions that seem viable. The averaging may be done with a least mean square solution, which is a conventional mathematical technique.

Figure 8:
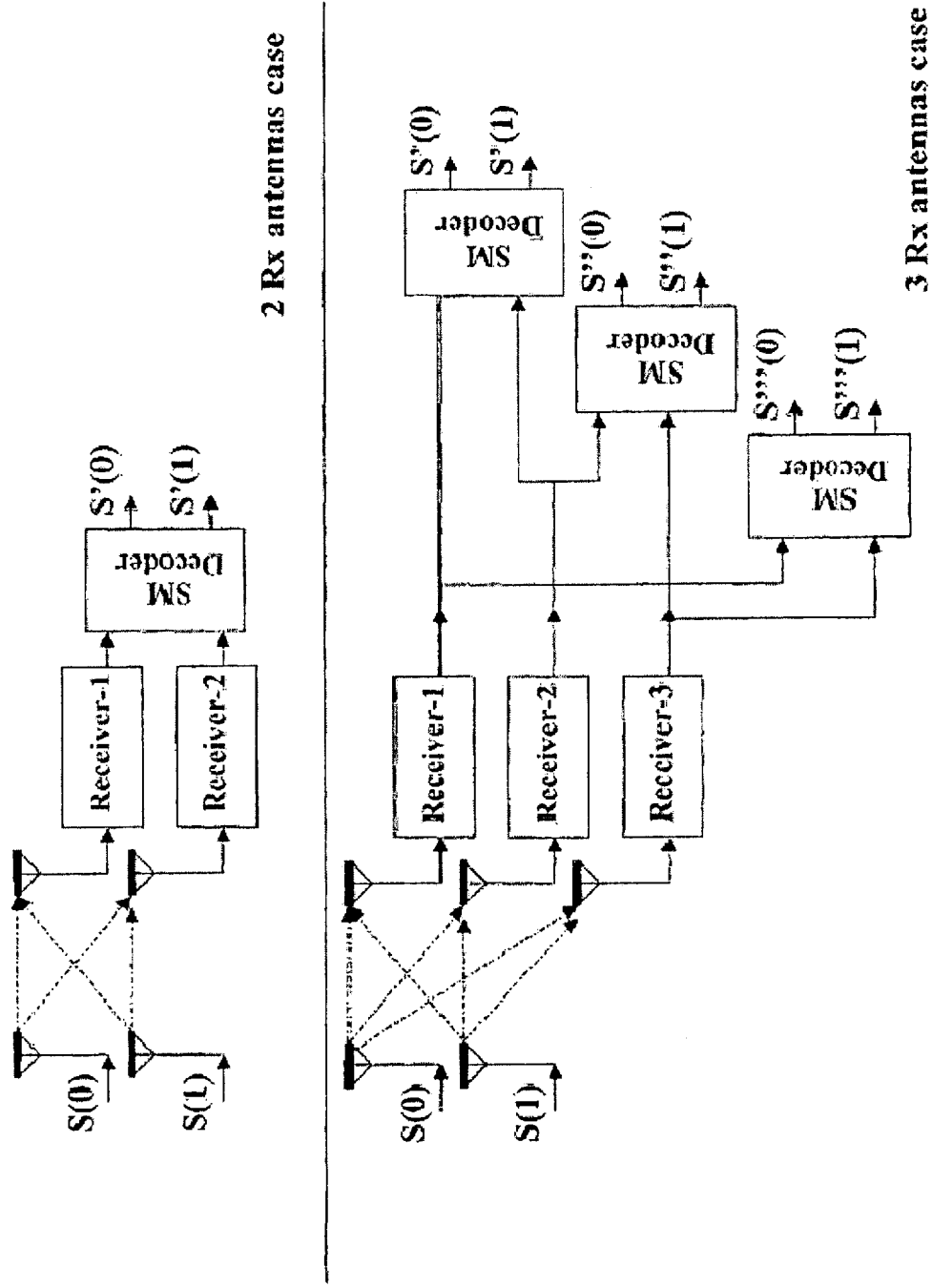
FIG. 8 is a schematic representation of configurations of a two receiver antenna case and a three receiver antenna case.

FIG. 8 compares a two receiver antenna case and a three receiver antenna case. With respect to the three receiver antenna case, the number of receiver antennas is greater than the number of transmitter antennas. As a consequence, the receiver has additional redundancy, the receiver has various configurations, the configurations yield several different decoding results. The most reliable solution can be selected from among them or all the solutions may be averaged to obtain a final result.

While the foregoing description and drawings represent the preferred embodiments of the present invention, it will be understood that various changes and modifications may be made without departing from the spirit and scope of the present invention.

What is claimed is:

1. A device, comprising:
   a plurality of first antennas configured to transmit a respective plurality of feedback signals from a channel to second antennas of a receiving device in response to receiving a plurality of Orthogonal Frequency-Division Multiplexing (OFDM) signals from the receiving device, the OFDM signals utilizing a common set of sub-carriers, the OFDM signals being received onto the channel by the first antennas, the first antennas further configured to receive feedback information from the receiving device, the feedback information encoding transmission type decisions for groups of sub-carriers, the transmission type decisions representing a selection between a transmit diversity and a spatial multiplexing (SM).

2. The device of claim 1, further comprising:
   a receiver configured to estimate a corresponding channel matrix based on the feedback signals and compute a corresponding channel condition based on the corresponding channel matrix.

3. The device of claim 2, wherein the channel condition of each sub-carrier is determined by the smallest eigenvalue of the matrix $H(k)H(k)^*$, where $H(k)$ represents the channel matrix corresponding to the group of sub-carriers.

4. The device of claim 2, wherein the channel condition of each sub-carrier is determined by the smallest element of the diagonal of the matrix $H(k)H(k)^*$, where $H(k)$ represents the channel matrix corresponding to the group of sub-carriers.

5. The device of claim 2, wherein the channel condition of each sub-carrier is determined by the ratio of the largest and smallest eigenvalues of the matrix $H(k)H(k)^*$, where $H(k)$ represents the channel matrix corresponding to the group of sub-carriers.

6. The device of claim 1, wherein the first antennas are configured to receive a second plurality of OFDM signals from the receiving device and wherein a transmission type for groups of sub-carriers of the second plurality of OFDM signals conforms to the respective transmission type decision as indicated by the feedback information.

7. The device of claim 1, wherein each of the groups of sub-carriers have a corresponding computed quality value, the quality value being one of a signal to noise ratio (SNR) and a carrier to interference (CI) ratio, a corresponding modulation scheme being selected based on the corresponding quality value to maintain a desired quality of service (QoS), the feedback information also including the selected modulation scheme for each of the sub-carriers.

8. The device of claim 1, wherein the transmit diversity is one of a space-time transmit diversity (STTD) and a space-frequency transmit diversity (SFTD).

9. A method, comprising:
   at a device:
   receiving via a plurality of first antennas a plurality of Orthogonal Frequency-Division Multiplexing (OFDM) signals from a second device;
   transmitting via the first antennas a respective plurality of feedback signals from a channel to second antennas of second device in response to receiving the OFDM signals, the OFDM signals utilizing a common set of sub-carriers, the OFDM signals being received onto the channel by the first antennas; and
   receiving feedback information from the second device, the feedback information encoding transmission type decisions for groups of sub-carriers, the transmission type decisions representing a selection between a transmit diversity and a spatial multiplexing (SM).

10. The method of claim 9, further comprising:
    estimating a corresponding channel matrix based on the feedback signals; and
    computing a corresponding channel condition based on the corresponding channel matrix.

11. The method of claim 10, wherein the channel condition of each sub-carrier is determined by the smallest eigenvalue of the matrix $H(k)H(k)^*$, where $H(k)$ represents the channel matrix corresponding to the group of sub-carriers.

12. The method of claim 10, wherein the channel condition of each sub-carrier is determined by the smallest element of the diagonal of the matrix $H(k)H(k)^*$, where $H(k)$ represents the channel matrix corresponding to the group of sub-carriers.

13. The method of claim 10, wherein the channel condition of each sub-carrier is determined by the ratio of the largest and smallest eigenvalues of the matrix $H(k)H(k)^*$, where $H(k)$ represents the channel matrix corresponding to the group of sub-carriers.

14. The method of claim 9, further comprising:
    receiving a second plurality of OFDM signals from the receiving device.

15. The method of claim 14, wherein a transmission type of each of the sub-carriers of the second plurality of OFDM signals conforms to the respective transmission type decision as indicated by the feedback information.

16. The method of claim 9, wherein each of the groups of sub-carriers have a corresponding quality value computed therefor, the quality value being one of a signal to noise ratio (SNR) and a carrier to interference (CI) ratio, a corresponding modulation scheme being selected based on the corresponding quality value to maintain a desired quality of service (QoS), the feedback information also including the selected modulation scheme for each of the sub-carriers.

17. The method of claim 9, wherein the transmit diversity is one of a space-time transmit diversity (STTD) and a space-frequency transmit diversity (SFTD).

18. A non-transitory computer readable storage medium with an executable program stored thereon, wherein the program instructs a microprocessor to perform operations comprising:
   receiving via a plurality of first antennas a plurality of Orthogonal Frequency-Division Multiplexing (OFDM) signals from a second device;
   transmitting via the first antennas a respective plurality of feedback signals from a channel to second antennas of second device in response to receiving the OFDM signals, the OFDM signals utilizing a common set of sub-carriers, the OFDM signals being received onto the channel by the first antennas; and
   receiving feedback information from the second device, the feedback information encoding transmission type decisions for groups of sub-carriers, the transmission type decisions representing a selection between a transmit diversity and a spatial multiplexing (SM).

* * * * *